M. B. LLOYD.
METHOD OF PRODUCING WOVEN REED ARTICLES.
APPLICATION FILED FEB. 6, 1917.
1,243,080.
Patented Oct. 16, 1917
3 SHEETS—SHEET 3.
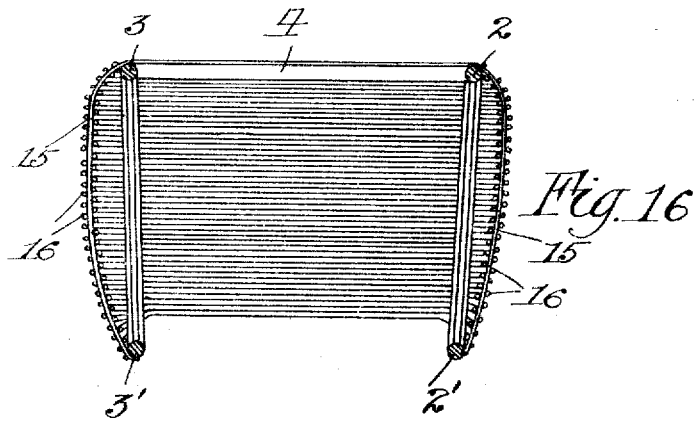
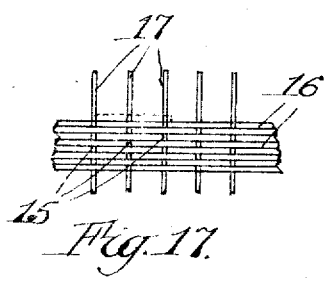
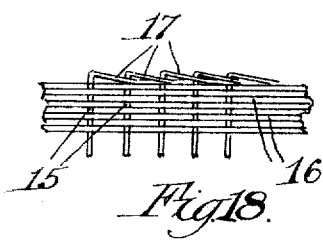
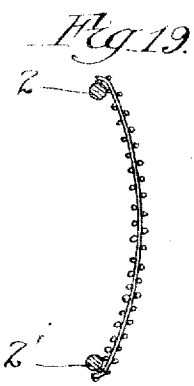
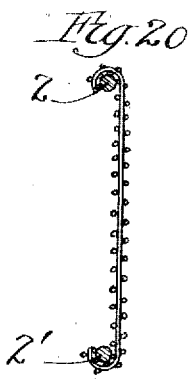
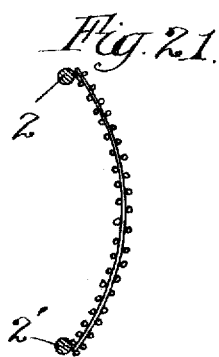
Inventor
Marshall B. Lloyd
by Arthur Wm Nelson
Atty

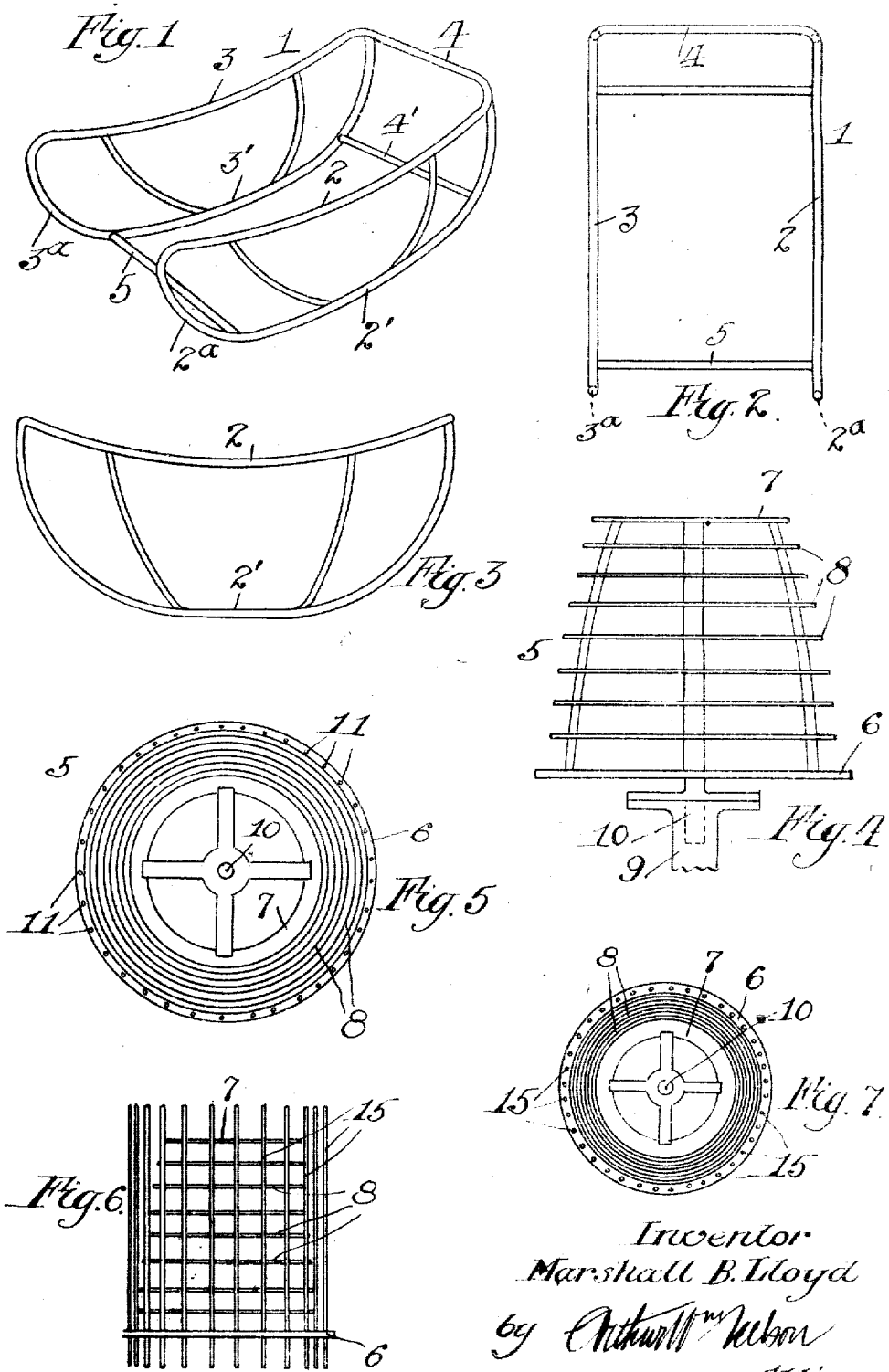

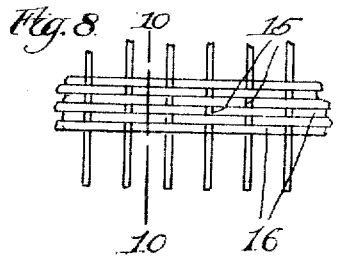
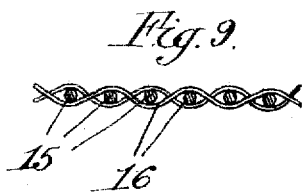
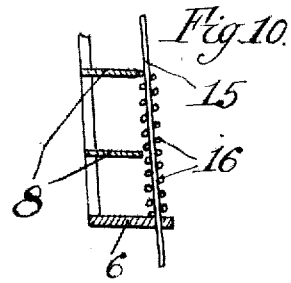
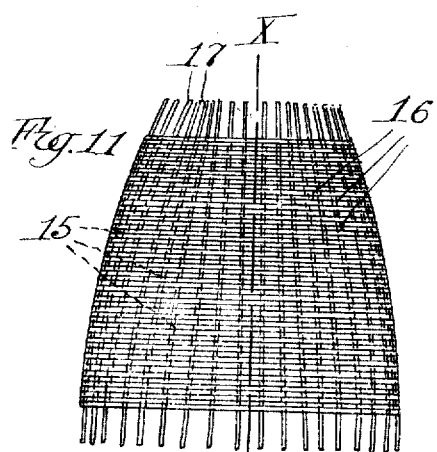
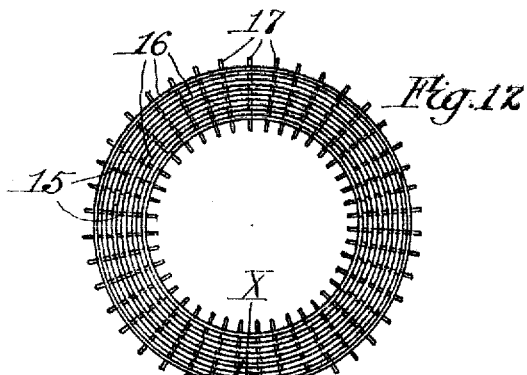
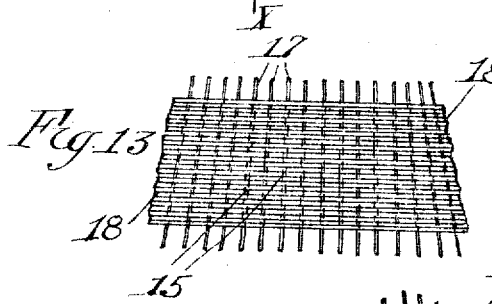
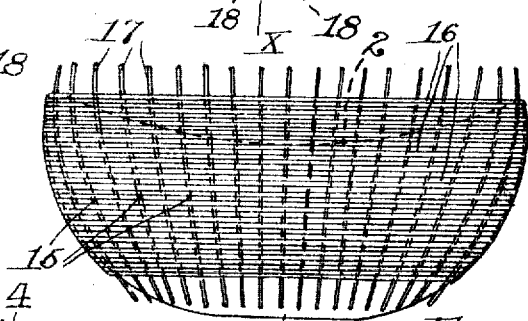
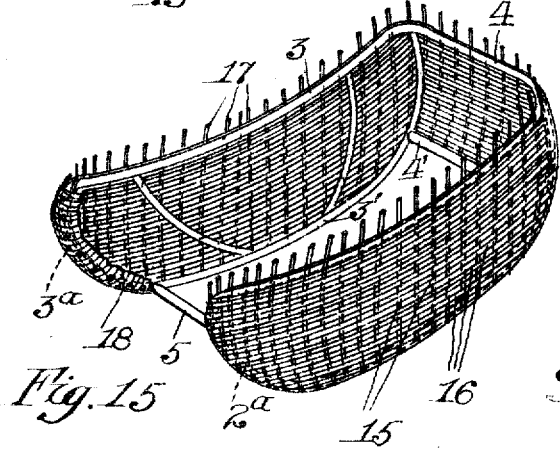

UNITED STATES PATENT OFFICE.

MARSHALL B. LLOYD, OF MENOMINEE, MICHIGAN.

METHOD OF PRODUCING WOVEN REED ARTICLES.

1,243,080.

Specification of Letters Patent.

Patented Oct. 16, 1917.

Original application filed July 17, 1916, Serial No. 109,714. Divided and this application filed February 6, 1917. Serial No. 146,909.

*To all whom it may concern:*

Be it known that I, MARSHALL B. LLOYD, a citizen of the United States, and a resident of Menominee, county of Menominee, and State of Michigan, have invented a certain new, useful, and Improved Method of Producing Woven Reed Articles, of which the following is a specification.

My invention relates generally to the manufacture of reed articles and relates more particularly to the manufacture of reed fabric, and also to its application to supporting frames.

This application is a divisional part of my co-pending application, entitled "Method of producing woven reed articles", filed July 17, 1916, Serial No. 109,714; and is directed particularly to the production of reed articles wherein the fabric is not endless or tubular.

The reed fabric with which my invention is concerned is composed of a plurality of spaced members called stakes, which may be of reed or wire and which in workable lengths have sufficient rigidity to be self-supporting and to resist considerable force tending to bend or kink abruptly. In this respect at least they differ greatly from the loose character of the threads of cloth which can be bent, twisted, or kinked in almost any manner with little force and without materially injuring them. Upon these stakes long strands called fillers, are woven over some of the stakes and under others. For example, the filler strand in some instances may pass over one stake and under the next adjacent stake, or it may pass over one stake and under the next two adjacent stakes, or it may vary in the manner in which it weaves under and over the stakes in a great many ways to produce different results and effects. The reed fabric with which my invention is concerned is also to be distinguished from cane fabric, such as is extensively used for chair seats and the like. While the filler strands may be and sometimes are put under such tension as will gradually curve or shape stakes, to the end that the finished fabric will have the desired form, the stakes are not usually abruptly bent or displaced by the filler strands, but on the other hand, the filler strands are bent and shaped to inter-weave around stakes.

In manufacturing reed articles, it has been the universal practice to weave the fabric free hand and for the reed worker to shape the article in the process of weaving to the desired form. If the article is one which must sustain considerable weight, or which is subject to heavy strains in use, such for example as a vehicle or an article of furniture, it is customary to provide a rigid frame and to cover the frame with the reed fabric.

In weaving such articles as have a supporting frame, it has been hitherto customary to fasten the stakes in spaced relation to the article frame and then to weave the filler strands thereon. If the article is one that is irregular in shape, the stakes project at various angles. During the weaving operation, under the hitherto universal practice, these stakes must be constantly shaped, positioned, and alined, so that the fabric will assume the desired shape and also will have an appearance of uniformity and particularly to the end that the stakes shall assume regular lines. The operation of weaving and shaping the reed fabric upon the article is a most difficult one because of these many variable factors and hence require highly skilled workmen, so much so that where there is any substantial amount of shaping, as is necessary under present methods in an article having pleasing curved lines, only workers having several years of experience can be employed and then the time required is considerable even to manufacture a relatively small article. As a result of the foregoing facts reed articles, while extensively used, are at the present time expensive.

The general object of my invention is to provide a method wherewith it shall be possible to weave reed articles with greater rapidity and at lower cost than has hitherto been possible.

Further objects of my invention are to provide a method of weaving reed articles in which many of the hitherto variable elements or factors shall be eliminated; wherewith artistic articles having curved or irregular lines can be produced with substantially the same ease as the straight, uniform, and simple articles; with which it shall be possible to weave the reed fabric with greater uniformity and with increased strength; wherewith unskilled workers can produce reed articles of the kind hitherto producible only by the most skilled workmen; and wherewith the hitherto highly individualistic weaving of each reed fabric upon each article frame can be reduced to a factory system of weaving the reed fabric apart from the frame and in applying it thereto in a manner to secure desired shapes and effects.

My invention consists generally in the manner, steps, acts, and sequence thereof, whereby the above named objects together with others which will appear hereinafter are obtainable; and my invention will be more readily understood by reference to the accompanying drawings illustrative thereof, and wherein:

Figure 1, is a perspective view of an article frame upon which it is desired to provide a reed covering.

Fig. 2, is a top plan view of the frame shown in Fig. 1.

Fig. 3, is a side elevation of the frame shown in Figs. 1 and 2.

Fig. 4, is a side elevation of a templet, guide, or form upon which I weave the fabric.

Fig. 5, is a plan view of the device shown in Fig. 3.

Fig. 6, illustrates the manner in which I weave the fabric.

Fig. 7, is a plan view of the mechanism shown in Fig. 5.

Fig. 8, is a detail of the fabric in the course of manufacture.

Fig. 9, is a cross-section of the fabric.

Fig. 10, is a detailed view substantially on the line 10—10 of Fig. 8.

Fig. 11, is a side elevation of the finished fabric, apart from the templet.

Fig. 12, is a plan view of the finished fabric.

Fig. 13, illustrates a strip of fabric which has been produced in endless form shown in Figs. 11 and 12 and then severed to form a strip.

Fig. 14, is a side view showing one step in the operation of securing the fabric to the article frame.

Fig. 15, is a view showing a further step in the operation of securing the fabric to the article frame.

Fig. 16, is a vertical transverse section through the finished article.

Figs. 17 and 18, illustrate a method of finishing the fabric edge; and

Figs. 19, 20, and 21, illustrate a method of giving different shapes to the fabric on the article.

For the purpose of illustration, I have chosen to depict the manufacture of a baby carriage body because such articles, in the reed ware, are used extensively, and furthermore because such articles on the one hand fairly illustrate the difficulties encountered in the production of reed articles under the hitherto universal method, and on the other hand the ease and simplicity of manufacturing articles under my method.

In the drawings, 1, illustrates the article frame which in this instance is somewhat U-shaped and has spaced upper and lower side bars 2—2' and 3—3' which are connected at the front end by cross bars 4 and 4' and near the rear by a cross bar 5. This type of frame is used in the manufacture of an open backed baby carriage. In order better to understand the difficulties of weaving fabric upon the frame in the hitherto customary manner I shall first briefly describe that method. Under the former method the stakes are secured to the frame in spaced relation along the bottom portion of the members 2' and 3' and along the front cross members 4'. In order to secure the bowed or curved shape in the fabric, as best shown in Figs. 16, 19, 20, and 21, it has been necessary to fasten the stakes into the side portions of the frame so that they project substantially at right angles thereto. The reed workers having fastened the stakes in this position start at the bottom and weave the filler strand over and under the stakes, at the same time shaping the stakes upwardly and placing the filler strands under just the right tension so that the stakes can be gradually turned from their right angular positions progressively upward. To shape these divergent stakes gradually upwardly, to maintain them in proper spaced relation, and to shape the filler strand with just that degree of tension necessary to give the desired shape and character to the fabric, is difficult indeed because of the many variable factors which must be considered and for which compensation must be made. In weaving the article here depicted, under prior practice, the filler strands are also wrapped around the portions $2^a$ and $3^a$ and passed back along the same side. In other words the filler strand follows a U course alternating from one extreme to the other.

I have solved this difficult complex problem in a very simple way by eliminating many of the variable factors and reducing the remaining ones to simple easily understood and easily manipulated steps. To this end instead of weaving the fabric upon the article frame which is usually of irregular shape, and which at best is poorly adapted for convenient weaving, I weave the fabric independent of the article frame in a convenient manner and then apply the finished woven fabric to and secure it upon the article frame. As will be better understood shortly, in this way, I secure freedom of movement and convenience in weaving which largely eliminate the present difficulties. Again I grip, space, and hold the stakes in such a way and in relation to a mechanical guide, templet, or form so that the most unskilled worker can weave the fabric by simply weaving in a natural manner around or against the templet or form. The templet is of such character that the fabric produced thereon will fit the desired frame, but the templet or form need not be of the same shape as the article to be covered as I find I can reshape the reed fabric after it is finished to admit covering article frames varying considerably in size, shape and character. In fact, I find that the weaving operation is greatly facilitated in many instances by weaving the fabric upon a circular or endless form or templet severing the fabric to destroy its endless form and then reshaping the fabric to elongated or such other shape as may be desired, or necessary for attachment to the article.

In the drawings 5, represents a suitable templet upon which I prefer in many instances to weave the fabric and which in this instance comprises a lower annulus 6, and an upper annulus 7, between which are a plurality of members 8, which serve as guides, limiting devices, or restraining elements as will be hereinafter more fully described. It so happens in this instance that it is desirable that the side of the article shall take a gentle bow as indicated in Fig. 16 and for this reason I prefer to make the sizes and relation of the guides 8, in such a manner that a line connecting their peripheries would be curved or bowed. The templet 5, is preferably mounted for rotation although this is a mere matter of convenience, upon a support 9, by any suitable means such for example, as the vertical shaft 10, which is secured centrally of the templet and which has a projecting portion entering a socket in the support. In the lower annulus 6, are a number of holes 11, suitably spaced in which the stakes 15, are placed and from which they upstand as illustrated in Figs. 6 and 7. These stakes it will be noted, upstand in regular form and encircle the templet guides 8. It is a most simple operation for the worker to weave the filler strands upon the stakes in this condition, it being but necessary to continue the filler strand or strands over and under the stakes and around the templet in regular courses from the bottom to the top, or conversely from the top to the bottom if desired, although I find it more convenient to work from the bottom upwardly. The filler strands are pulled so that the stakes just follow the guides 8, of the templet substantially as indicated in Fig. 10. The templet, therefore, so limits the movement of the stakes and the tension upon the filler strands that the fabric is naturally shaped to the form of the templet. The relatively close relation of the guides 8, prevents the stakes from being bent in beyond the desired point or line. In this manner an endless fabric having uniform courses of the filler strand can be produced rapidly by even an unskilled worker. The completed fabric is shown in Figs. 11 and 12 wherein 15, are the stakes and 16, the filler strands. In this instance I have left portions 17, of the stakes projecting from the body of the fabric at each end, the purpose of which will be shortly described. To mount the woven fabric upon the article frame I sever it, as along the line $x$—$x$ (see Figs. 11 and 12) and thereby destroy its endless or tubular form and provide a strip as indicated in Fig. 13. Without applying forces to distend the fabric it will retain generally its circular shape. In this condition it can be easily placed over the article frame starting the large open end of the fabric over the bottom smaller end of the frame. Having placed the fabric upon the frame as indicated in the side view Fig. 14, I fasten it to the ends of the frame in which condition it will be noted that the fabric projects above the middle portion of the side members of the frame and does not quite extend to the lower portion. The reason for this is that the filler strands of the fabric are woven in regular progressive courses while the frame is curved or depressed in the middle. I have discovered, however, that I can readily shape the fabric to the frame by simply pulling upon it and also that the stakes serve as convenient handles for that purpose. I pull upon the lower ends of the stakes until the lowermost filler strand substantially coincides with the lower frame member at which time I secure the fabric in place by means of tacks, brads or other suitable fastening devices. By making the lower portion of the fabric follow the lower frame members the upper portion will generally follow the upper frame members as indicated in Fig. 15. In this manner the uniform filler strand courses are made to assume the desired irregular course necessary to fit the article. It is immaterial whether or not a slight amount of the fabric projects above the frame as it can be readily folded thereon. In fact, in some instances I designedly provide sufficient fabric for that purpose. Thus it becomes evident that I can manufacture the fabric with the filler strands progressing in regular courses and apply the finished fabric to an article, which if the fabric were woven thereon would require that the worker shape the strands irregularly and in non-parallel relation. It will be understood that the end portions 18 of the severed fabric are folded over the portions $2^a$—$3^a$ of the frame and there fastened by suitable fastening devices (see Fig. 15). In this manner a U-shaped or open backed reed article is produced. At this time I might also state that I can give varying degrees of curvature to the sides of the article body (cross-sectionally considered) by fastening the fabric along the bottom or top and pulling with greater or lesser force thus placing the fabric under more or less tension. In Fig. 20, I have wrapped the fabric or folded it well over the frame members and have made it substantially taut therebetween. This gives but little curvature to the sides and to secure a somewhat greater curvature I may proceed as indicated in Fig. 19, wherein I have illustrated the same fabric pulled with less force and wrapped a lesser distance around the frame which gives a greater bow or more curvature to the fabric. Again I may secure a still greater bow or curvature by proceeding as indicated in Fig. 21. In this instance the fabric is not wrapped around frame members to any substantial extent but is secured somewhat along the sides of the frame, thus placing all of the fabric between frame members and consequently giving it a greater bow or curvature with a resulting diminution in the tension. In this way a number of different effects can be produced from a given fabric.

In Fig. 15, I have illustrated the reed simply attached to the article frame and before the projecting end portions of the stakes are folded down to present a finished edge. There are many ways of finishing the edge of the fabric and I have illustrated but one way in Figs. 17 and 18. The portions 17 of the stakes are bent at right angles as indicated by the dotted line (see Figs. 17) each end portion passing over the next adjacent stake and behind the second one thus producing a finished edge 15, as shown in Fig. 18. Of course, I may so finish the edges of the fabric before it is placed upon the frame if desired, but I have so far found it more convenient to leave the projecting portions of the stakes and to finish them after they are placed upon the article.

It may be well here to note that in producing the article shown by the hitherto usual method, it is necessary to employ many short lengths which must be woven in places where the fabric departs from the general shape or uniform course, while by my novel method the weaving can be done by full length strands serially woven in regular courses, or where the reed is procurable in endless form as, for example, paper reed, a single strand can be woven to complete the entire fabric. A great saving in both time and material is thus effected. The tremendous advantages of this method will be obvious to those skilled in the art without further comment.

In qualifying the fabric or its elements as "reed" in the specification or claims, I mean to limit my invention to fabric the elements of which coöperate in the manner above described as are characteristic of the stake and strand fabric made of reed, but to embrace such materials whether they be the natural reed, paper reed, or other materials having the general characteristics of reed.

For some articles, templets, forms, or mechanical guides of different sizes, shapes and character will be employed, but my method will be found to be characterized by weaving the reed fabric in a manner convenient for the weaving operation and when necessary or desirable reshaping and applying it to the article frame, as distinguished from the hitherto universal practice of weaving in a manner which is inconvenient, slow, laborious and dependent upon a high degree of skill in the workman. With my method by providing relatively few templets of different sizes and shapes reed articles in great variety can be produced rapidly by unskilled workers and at relatively low cost.

Inasmuch as this disclosure will readily suggest to others skilled in the art to which this appertains, various methods whereby the substantial objects of my invention can be attained, I do not wish to be limited to the specific stated manner of procedure nor to the precise steps, acts, or stated sequence thereof, except only as may be necessary by limitations in the hereunto appended claims.

I claim:

1. The method of manufacturing reed articles having a frame and a non-endless reed fabric which consists in weaving the reed fabric in endless form, severing the fabric to destroy its endless form and attaching the fabric to the frame.

2. The method of manufacturing reed articles having a frame and a non-endless reed fabric which consists in weaving the reed fabric in an endless form different from the frame, severing the fabric to destroy its endless form, re-shaping it and attaching it to the frame.

3. The method of manufacturing reed articles having a frame and a non-endless reed fabric which consists in weaving the reed fabric about a templet in an endless form different from the frame, severing the fabric to destroy its endless form, re-shaping it and attaching it to the frame.

4. The method of manufacturing reed articles having a frame and a non-endless reed fabric which consists in weaving the reed fabric in endless form of circular cross section and different from the frame, severing the fabric to destroy its endless form, re-shaping it and attaching it to the frame.

5. The method of manufacturing reed articles having a frame and a non-endless reed fabric which consists in weaving the reed fabric about a templet in an endless form of circular cross section and different from the frame, severing the fabric to destroy its endless form, re-shaping it and attaching it to the frame.

6. The method of manufacturing reed articles having a frame and a non-endless reed fabric which consists in weaving the reed fabric in an endless form, severing the fabric to destroy its endless form, folding desired marginal portions of the fabric out of its plane of weave and attaching the fabric to the frame.

7. The method of manufacturing reed articles having a frame and a non-endless reed fabric which consists in weaving the fabric in endless form, severing the fabric to destroy its endless form, re-shaping the body portions of the fabric, folding desired marginal portions out of the plane of weave, and attaching the fabric to the frame.

8. The method of manufacturing reed articles having a frame and a non-endless reed fabric which consists in weaving the fabric in endless form, severing the fabric to destroy its endless form, folding desired marginal portions of the fabric over the frame and attaching the fabric to the frame.

9. The method of manufacturing reed articles having a frame and a non-endless reed fabric which consists in weaving the fabric in endless form different from the frame, severing the fabric to destroy its endless form, re-shaping the body of the fabric, folding desired marginal portions of the fabric over the frame and attaching the fabric to the frame.

10. The method of manufacturing reed articles having a frame and a non-endless reed fabric which consists in weaving the reed fabric in an endless form with the filler strands upon the stakes in substantially parallel relations, severing the fabric to destroy its endless form, re-shaping the fabric to cause a substantial part of the filler strands to assume non-parallel relations at least in part, and attaching the fabric to the frame.

11. The method of manufacturing reed articles having a frame and a non-endless reed fabric which consists in weaving the fabric in endless form different from the frame and with the filler strands upon the stakes in substantially parallel relations, severing the fabric to destroy its endless form, re-shaping the fabric out of the plane of weave, re-shaping the fabric to cause a substantial part of the filler strands to assume non-parallel relations at least in part, and attaching the fabric to the frame.

12. The method of manufacturing reed articles having a frame and a non-endless reed fabric which consists in weaving the fabric in endless form and of different cross sectional dimensions, severing the fabric to destroy its endless form and attaching the fabric to the frame.

13. The method of manufacturing reed articles having a frame and a non-endless reed fabric which consists in weaving the fabric in endless form with its contour curved with respect to its axis at least in part, and having different cross sectional dimensions, severing the fabric to destroy its endless form, and attaching the fabric to the frame.

14. The method of manufacturing reed articles having a frame and a non-endless reed fabric which consists in weaving the fabric, about a templet, in endless form with its contour curved with respect to its axis at least in part, severing the fabric to destroy its endless form, re-shaping the fabric out of its plane of weave and attaching the fabric to the frame.

15. The method of manufacturing reed articles having a frame and a non-endless reed fabric which consists in weaving the fabric, about a templet, in endless form with its contour curved with respect to its axis at least in part, severing the fabric to destroy its endless form, re-shaping the body of the fabric, folding desired marginal portions of the fabric out of its plane of weave and attaching the fabric to the frame.

16. The method of manufacturing reed articles having a frame and a non-endless fabric which consists in weaving the fabric, about a templet, in endless form with its contour curved with respect to its axis at least in part, folding desired marginal portions of the fabric over the frame, distorting the fabric edgewise and securing the fabric to the frame.

17. The method of manufacturing non-circular reed articles which consists in providing an article frame, weaving the fabric to circular form, severing the finished reed fabric and applying it to the article frame.

In testimony thereof, I have hereunto set my hand, this 25th day of January, 1917, in the presence of two subscribing witnesses.

MARSHALL B. LLOYD.

Witnesses:
ARTHUR WM. NELSON,
FRANK L. SALEN.